(12) United States Patent
Bornemann et al.

(10) Patent No.: US 9,902,104 B2
(45) Date of Patent: Feb. 27, 2018

(54) CONDUIT RESONATOR

(71) Applicant: ContiTech MGW GmbH, Hannoversch-Muenden (DE)

(72) Inventors: Axel Bornemann, Katlenburg-Lindau (DE); Charles Bavoux, Koenigstein (DE); Bernhard Schulte, Langenberg (DE); Knut Hensel, Kohren-Sahlis (DE)

(73) Assignee: ContiTech MGW GmbH, Hannoversch Muenden (DE)

( * ) Notice: Subject to any disclaimer, the term of this patent is extended or adjusted under 35 U.S.C. 154(b) by 177 days.

(21) Appl. No.: 14/860,172

(22) Filed: Sep. 21, 2015

(65) Prior Publication Data

US 2016/0009017 A1    Jan. 14, 2016

Related U.S. Application Data

(63) Continuation of application No. PCT/EP2014/053681, filed on Feb. 26, 2014.

(30) Foreign Application Priority Data

Mar. 26, 2013    (DE) .................. 10 2013 103 078

(51) Int. Cl.
*B29C 49/06* (2006.01)
*B29D 23/18* (2006.01)
(Continued)

(52) U.S. Cl.
CPC .......... *B29C 49/06* (2013.01); *B29C 49/0073* (2013.01); *B29C 49/062* (2013.01);
(Continued)

(58) Field of Classification Search
None
See application file for complete search history.

(56) References Cited

U.S. PATENT DOCUMENTS

| 5,002,719 A | 3/1991 | Shirai et al. |
| 5,806,480 A | 9/1998 | Maeda et al. |

FOREIGN PATENT DOCUMENTS

| DE | 10 2004 049 446 A1 | 4/2006 |
| DE | 10 2008 016 690 A1 | 10/2009 |
| JP | 53-30660 A | 3/1978 |

OTHER PUBLICATIONS

International Search Report dated May 15, 2014 of international application PCT/EP2014/053681 on which this application is based.

*Primary Examiner* — Monica Huson
(74) *Attorney, Agent, or Firm* — Walter Ottesen, P.A.

(57) ABSTRACT

A method for making a substantially tube-shaped conduit resonator having a plurality of plastic component parts, the conduit resonator having a tubular hollow body and at least one tubular molded part arranged inside the tubular hollow body and connected to the tubular hollow body, the method comprising the steps of: making a molded part via an injection molding process in an outer tool having an inner mandrel; injecting the hollow body between the molded part and a surrounding outer tool wherein the molded part along with the inner mandrel serve as an inner tool; and, thereafter, via a blow molding process, seating the hollow body on the inner wall of the outer tool and reshaping the hollow body on the outer wall of the molded part and bonding the hollow body, in part, to the outer wall of the molded part.

2 Claims, 4 Drawing Sheets

(51) Int. Cl.
  *B29C 49/00*   (2006.01)
  *B29L 31/00*   (2006.01)
  *B29L 16/00*   (2006.01)
  *B29L 23/18*   (2006.01)
  *B29C 49/28*   (2006.01)
  *B29L 23/00*   (2006.01)
(52) U.S. Cl.
  CPC .............. *B29D 23/18* (2013.01); *B29C 49/28* (2013.01); *B29C 2049/0089* (2013.01); *B29K 2995/0091* (2013.01); *B29L 2016/00* (2013.01); *B29L 2023/00* (2013.01); *B29L 2023/18* (2013.01); *B29L 2031/721* (2013.01); *B29L 2031/7492* (2013.01)

CONDUIT RESONATOR

CROSS REFERENCE TO RELATED APPLICATIONS

This application is a continuation application of international patent application PCT/EP2014/053681, filed Feb. 26, 2014, designating the United States and claiming priority from German application 10 2013 103 078.5, filed Mar. 26, 2013, and the entire content of both applications is incorporated herein by reference.

FIELD OF THE INVENTION

The invention relates to a method for producing a substantially tubular conduit resonator including a plurality of plastic components. The resonator has one or more tubular moldings arranged inside a tubular hollow body and connected to the tubular hollow body.

BACKGROUND OF THE INVENTION

Resonators in fluid conduits for avoiding unpleasant acoustic emissions when the fluid vibrates in the fluid conduit have been known and used for a long time. At the present time, they are mostly constructed from plastics, use being made predominantly of injection moldings but also of blow moldings. Injection moldings have the disadvantage that the resonators have a plurality of individual parts and therefore require a fairly complicated assembly or welding process. Blow molding, on the other hand, is a relatively inexpensive production method and therefore the use of blow moldings is increasingly targeted.

DE 10 2008 016 690 A1 shows a resonator of the type in question in which both resonator parts are configured as blow moldings. The parts each have a collar and are connected to one another airtight at the collars.

The technical teaching disclosed here allows only resonators with just one resonance chamber. This single chamber is connected to the actual fluid conduit via an annular gap (19). Although this solution is distinguished by great simplicity, its range of use is only limited since multi-chamber systems cannot be achieved without further effort.

U.S. Pat. No. 5,806,480 discloses a fluid conduit which has, in a longitudinal section, two nested tubes, between which a chamber surrounding the inner tube is arranged. In this case, the chamber communicates via openings machined into the inner tube with the interior of the inner tube. To produce this tubular piece, the inner tube is first of all injection molded. A blank for the outer tube is then produced via an extrusion process and is bent in such a way that it surrounds the inner tube. The outer tube blank is then reshaped via a blow molding process in order to produce the outer tube.

The process for bending, blow molding and fastening the outer tube on the inner tube is quite complex and a tool of complicated construction is required since the entire bent conduit section must be inserted into the tool (see FIG. 3 of U.S. Pat. No. 5,806,480), and therefore a separate tool has to be provided for each conduit section and since the blow molding step is not very precisely defined as regards the maintenance of the shape of the inner part, despite the connecting openings.

SUMMARY OF THE INVENTION

It is an object of the invention to provide a fluid conduit having a resonator or conduit resonator of the type described above, which is improved and can be produced in a simple manner.

This object is, for example, achieved by a method for making a substantially tube-shaped conduit resonator having a plurality of plastic component parts, the conduit resonator having a tubular hollow body and at least one tubular molded part arranged inside the tubular hollow body and connected to the tubular hollow body. The method includes the steps of: making a molded part via an injection molding process in an outer tool having an inner mandrel; injecting the hollow body between the molded part and a surrounding outer tool wherein the molded part along with the inner mandrel serve as an inner tool; and, thereafter, via a blow molding process, seating the hollow body on the inner wall of the outer tool and reshaping the hollow body on the outer wall of the molded part and bonding the hollow body, in part, to the outer wall of the molded part.

In a first molding step, the molded part is produced via an injection molding process in an outer tool having an inner mandrel, and the inner mandrel continues to be used in the rest of the process, wherein, after the first molding step has been carried out, the molded part then serves with its inner mandrel as an inner tool in a second molding step, wherein, in the second molding step, the hollow body is injected between the molded part and a surrounding outer tool, and the hollow body is then reshaped by a blow molding process so as to rest on the inner wall of the outer tool and on the outer wall of the molded part and is bonded, in part, to the latter.

This allows any desired shape for the hollow body and hence enables it to be adapted to various of the resonances of the fluid system and to different adaptations of the cavity between the molded part and the hollow body. The accuracy of production as regards the volume is very important since it decisively affects acoustic effectiveness.

The molded part, that is the inner part and the outer part of the resonator, that is, therefore the hollow body are thus joined together in a highly accurate way to form an integrated component which can be installed directly and without further connecting steps in the fluid conduit. On the one hand, this simplifies the assembly of the resonator and, on the other hand, also eliminates the risk of leaks due to assembly or welding errors.

Thus, the core concept of the invention is the process-engineering implementation of two process steps/processes in a linked process and the insertion of an inner part into a volume-containing body with narrow tolerances, which can be adapted according to acoustic requirements.

While the resonators disclosed in the prior art by DE 10 2008 016 690 A1 and U.S. Pat. No. 5,806,480 are not pressure resistant and can therefore be used only in the air intake system, that is, are usually used between the air filter and the intake system, the resonator according to the invention is stable under pressure and temperature-stable and is suitable for use on the pressure side (hot side) at an installation point between the turbocharger and the cooler.

In an advantageous embodiment at least two conduit resonators, each having two molded parts and two hollow bodies connected to the molded parts, are produced in a single procedure in the method. This simplifies the method, reduces production and tooling costs and thus allows production to be carried out at lower cost.

Thus, a solution according to the invention includes the special integration of the injection molding and blow molding processes, thus eliminating the need for hitherto customary follow-up processes, such as welding. The only follow-up processes are de-flashing or deburring and pressure testing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
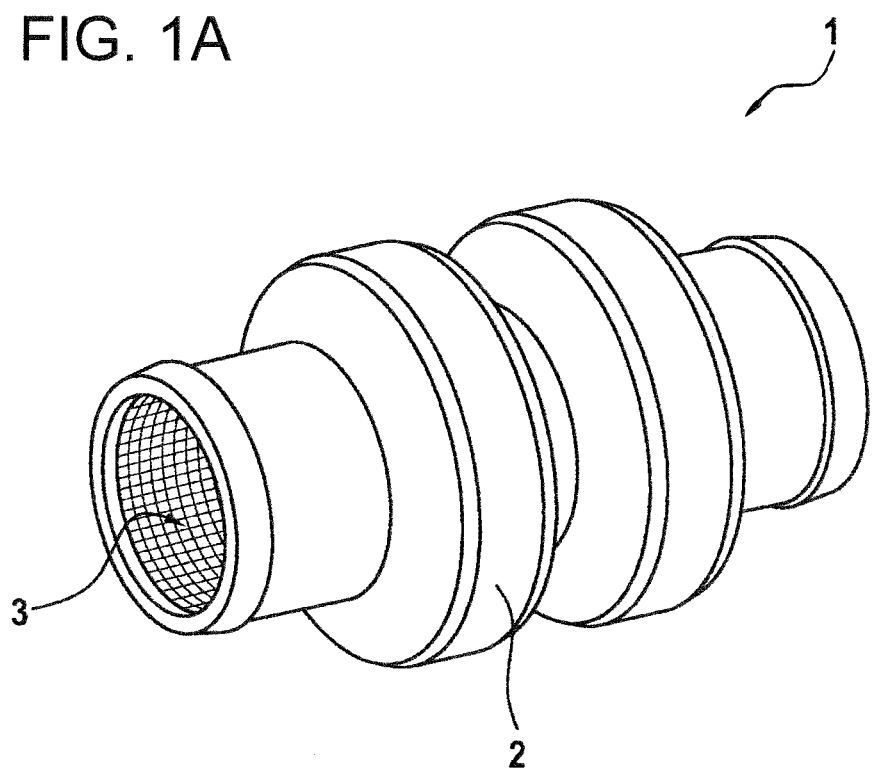
FIGS. 1A to 1C show a tubular conduit resonator made according to the invention both when assembled and as individual parts.
Figure 1B:
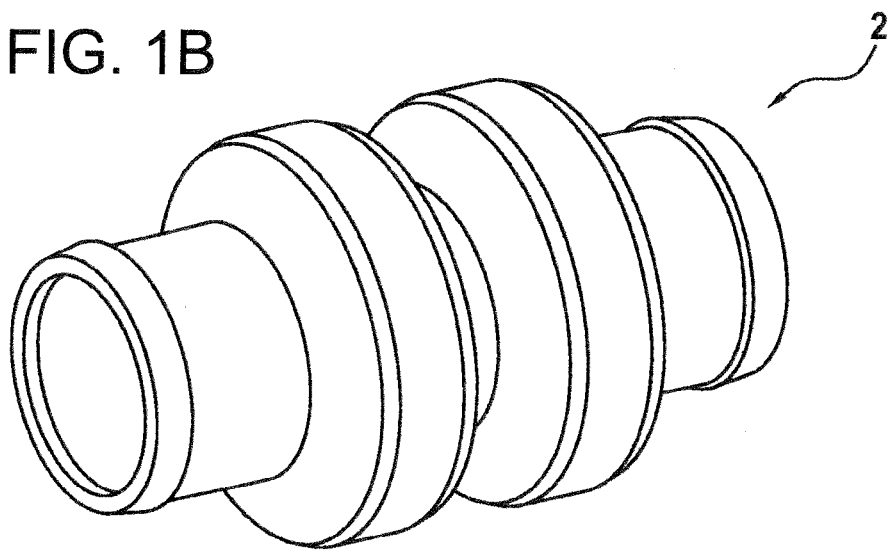
Figure 1C:
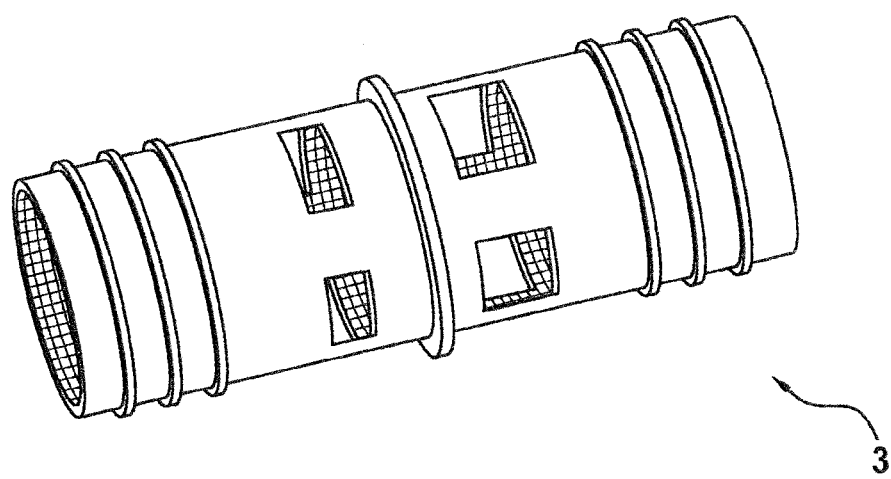

FIGS. 1A to 1C show a tubular conduit resonator 1 produced according to the invention for a fluid conduit which includes a tubular molded part 3 arranged within a tubular hollow body 2 and connected to the hollow body. Here, FIG. 1A shows the conduit resonator 1 in the finished state, FIG. 1B shows the hollow body 2 produced by blow molding in the second molding step as an individual part, and FIG. 1C shows the molded part 3 produced in the first molding step via an injection molding process as an individual part.

Figure 2:
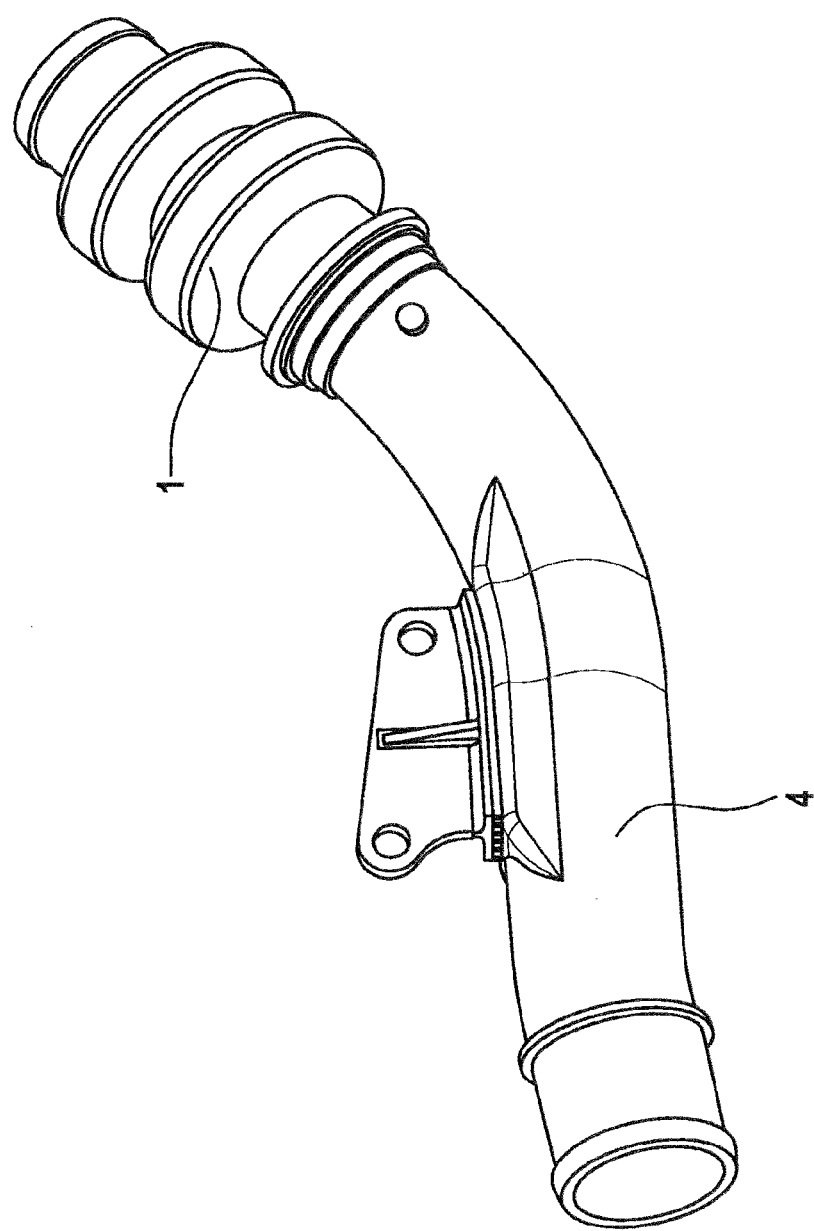
FIG. 2 shows part of a conduit having a conduit resonator made according to the invention; and, FIG. 3 is a schematic showing a production system for carrying out the method according to the invention as a schematic diagram.

FIG. 2 shows a part including a conduit 4 between a turbocharger and a cooler of an engine (not shown) for a motor vehicle having a conduit resonator 1 produced according to the invention.

Figure 3:
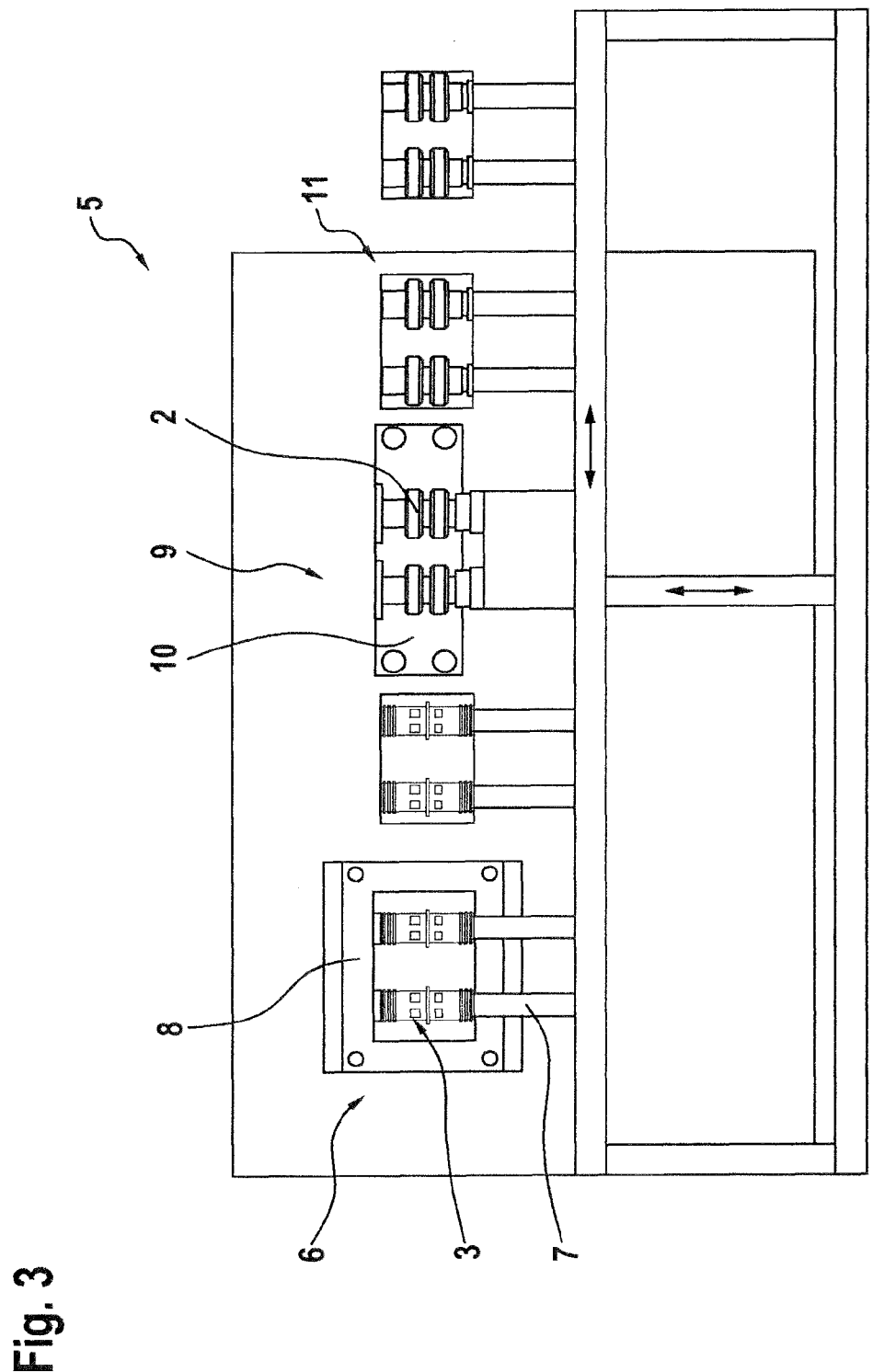

FIG. 3 shows a production system 5 for carrying out the method according to the invention as a schematic diagram. In a first molding station 6, the molded part 3 is produced there in a first molding step via an injection molding process in an outer tool 8 having an inner mandrel 7. In a second molding station 9, in which the molded part 3 with its inner mandrel 7 serves as an inner tool, the hollow body 2 is injected between the molded part 3 and a surrounding outer tool 10 in a second molding step. Thereafter, the hollow body 2 is reshaped by a blow molding process so as to rest on the inner wall of the outer tool 10 and on the outer wall of the molded part 3. Deburring 11 and the discharge of the finished conduit resonator follow in further stations.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)

1 conduit resonator
2 hollow body
3 molded part
4 conduit
5 production system
6 first molding station
7 inner mandrel
8 outer tool, injection molding
9 second molding station
10 outer tool, blow molding
11 deburring station

What is claimed is:

1. A method for making a substantially tube-shaped conduit resonator having a plurality of plastic component parts, the conduit resonator having a tubular hollow body and at least one tubular molded part arranged inside the tubular hollow body and connected to the tubular hollow body, the method comprising the steps of:

making, in a first molding step, a molded part via an injection molding process in an outer tool having an inner mandrel;

injecting the tubular hollow body between the molded part and a surrounding outer tool in a second molding step wherein the molded part along with the inner mandrel serve as an inner tool; and, thereafter, via a blow molding process, seating the tubular hollow body on the inner wall of the outer tool and reshaping the tubular hollow body on the outer wall of the molded part and bonding the tubular hollow body, in part, to the outer wall of the molded part.

2. The method of claim 1, wherein at least two conduit resonators having respective molded parts and respective hollow bodies bonded to corresponding ones of the molded parts are produced in a single procedure.

* * * * *